United States Patent Office 3,541,058
Patented Nov. 17, 1970

---

3,541,058
WATER SOLUBLE THERMOSETTING COATINGS FROM POLYALLENE
Giffin D. Jones, Midland, and Harold H. Roth, Bay City, Mich., assignors to The Dow Chemical Company, Midland, Mich., a corporation of Delaware
No Drawing. Filed July 11, 1968, Ser. No. 743,940
Int. Cl. C08f 27/00
U.S. Cl. 260—78.5     13 Claims

ABSTRACT OF THE DISCLOSURE

Water and alkali insoluble coatings are prepared from a composition comprising a water soluble nitrogeneous salt of a carboxylic modified polyallene in aqueous admixture with a polyfunctional dienophile. The polyallene, containing conjugated unsaturation, is modified by a Diels-Alder reaction of at least 65% and no more than 90% of the unsaturation with a carboxylic dienophile, such as maleic anhydride, and solubilized by combining it with a nitrogenous base. The residual unsaturation is reacted with a polyfunctional dienophile, such as diethylene glycol diacrylate, to crosslink the coating composition during drying and curing.

BACKGROUND OF THE INVENTION

The present invention relates to water soluble compositions suitable for coating purposes and like uses and further relates to coatings prepared from the compositions which upon curing are essentially water and alkali insoluble and water resistant.

Two approaches have been investigated to replace an organic solvent necessary with many coating formulations. The first approach has been to formulate without a solvent. The second approach has been to chemically modify the coating ingredients to make them water soluble, but at the same time the ingredients must be sufficiently co-reactive to form a coherent water insoluble film upon drying and/or curing. Water is a highly desirable solvent because it is cheap and available, non-flammable and non-toxic.

SUMMARY OF THE INVENTION

This invention is directed to a thermosettable compositions comprising in aqueous admixture a carboxylic modified polyallen solubilized as a salt of a nitrogenous base and a polyfunctional dienophile as a crosslinking agent. An allene polymer substantially of the formula:

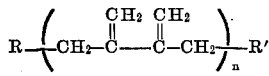

wherein R and R' each may be H,

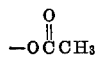

or OH and n is the average number of repeating groups, is modified by reacting at least about 65 and no more than 90% of its conjugated unsaturated groups with a carboxylic dienophile to introduce water solubilizing groups into said polymer. Coatings which are water and alkali insoluble and water resistant may be readily prepared from said aqueous compositions by drying and curing.

DETAILED DESCRIPTION

The allene polymer varies in form from a waxy solid, to a soft gel, to a rubbery solid. It is normally light yellow in color, soluble in non-polar organic solvents but insoluble in water and other similar polar solvents.

The polymer contains conjugated unsaturated groups and is substantially represented by the formula:

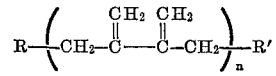

wherein R and R' each may be H,

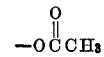

or OH and n is the average number of repeating groups in the polymer. The molecular weight of the allene polymer ranges from aboot 1,000 to 5,000 although the usefulness of the polymer in this invention is not limited thereto. The allene polymer and its preparation is more fully disclosed in an application of G. D. Shier, Ser. No. 625,007 filed on Mar. 22, 1967 and is incorporated by reference herein.

The carboxylic modified polyallene is prepared by reacting at least about 65% and no more than about 90% of the conjugated unsaturation of said allene polymer with a carboxylic dienophile. This reaction is well known as a Diels-Alder reaction and readily takes place with a reactive dienophile such as maleic anhydride. Less reactive dienophile may require a longer reaction time and/or heating to an elevated temperature. A variety of suitable inert solvents and mixed solvents which are well known may be advantageously used. The residual conjugated unsaturation is utilized later to crosslink said modified polyallene.

Carboxylic dienophiles include a variety of well known reactants and are characterized by having a reactive double bond wherein there is at least one carbonyl group adjacent to a double bond and preferably has two carbonyl groups adjacent the double bond, such as in maleic anhydried. In addition to maleic anhydride suitable carboxylic dienophiles include acrylic acid, methacrylic acid, crotonic acid, cinnamic acid, maleate half esters, maleamic acid (the half amide), substituted maleamic acids, maleimide, citraconic anhydride, maleic acid, fumaric acid and the like.

The water soluble salt is prepared by combining the carboxylic modified polyallene with a nitrogenous base. Suitable bases include ammonia or ammonium hydroxide, and a variety of volatile, water soluble amines such as the lower alkyl amines wherein each alkyl group may contain up to about 4 carbon atoms. Suitable amines include ethyl, diethyl and triethyl amine, the analogous methyl amines, amines having alkyl groups of different chain length, etc. Preferably the base is ammonia or ammonium hydroxide or tertiary amines.

Combination of the nitrogenous base with the carboxylic modified polyallene usually produces an ammonium or substituted ammonium salt. However when the solubilizing group is an anhydride the resulting salt may be an ammonium or substituted ammonium salt of a half amide. A sufficient amount of the base must be used to solubilize the carboxylic modified polyallene.

In addition to said polymer salt, previously described, the composition must also contain a polyfunctional dienophile, i.e. a dienophile having two or more groups by which crosslinking can take place as the coating is dried or cured. Polyfunctional dienophiles include compounds containing at least two reactive double bonds per molecule which are capable of reaction with conjugated unsaturated groups. Usually the compounds contain a carbonyl group adjacent the double bond such as diacrylate or dimethacrylate esters of glycols or the acrylate (and methacrylate) esters of polyols such as pentaerythritol, glycerine, etc. Useful polyfunctional dienophiles include diethylene glycol diacrylate, tetramethylene glycol dimethacrylate, 1,3 butylene glycol Also included within the definition of polyfunctional dienophiles are dienophiles containing a reactive double bond but which contain at least two groups which are coreactive when the coating is dried and cured. Suitable compounds include a disulfonium salt having the formula:

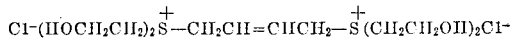

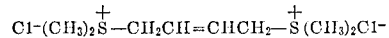

The disulfonium salt, above, adds to the polymer via the double bond but crosslinking takes place via the sulfonium groups. The mechanism of this reaction is not known but crosslinking is obtained upon heating.

The compositions of this invention contain a sufficient amount of the polyfunctional dienophile to react with the residual conjugated unsaturated in said modified polyallene and to crosslink the composition to a water insoluble film upon drying and curing the coating.

Coatings may be applied in a variety of ways such as by casting, brushing, dipping, spraying, etc. and are then dried and cured by heating at elevated temperatures. The temperature may vary quite widely but generally ranges from about 120° C. to about 200° C.

The following non-limiting examples are presented to further illustrate the invention.

EXAMPLE I

A 5 gm. portion of an allene polymer was dissolved in 20 gm. of a 50:50 solvent mixture of benzene: dimethyl formamide. To the solution was then added 5 gm. of maleic anhydride (80% of theoretical amount). The mixture was agitated for 16 hours at room temperature with a temperature rise to 35° C. noted after ½ hour. The clear solution was then evaporated to a syrup and vacuum dried at 85° C. to a dry, friable solid. 9.7 gm. of product).

The addition of 1 gm. of 28% ammonium hydroxide to 0.5 gm. of the maleic anhydride modified polymer in 3 gm. of water produced a clear solution in about 2 minutes.

Four experiments were made with the above modified polyallene (MA-P(A)). A clear solution was prepared in each of four 9.5 mm. petri dish by adding 0.5 gm. of MA-P(A) polymer, 3 gm. of water and 1 gm. of 28% NH₄OH to each dish.

(a) As a control the above solution in the first dish was dried to a film at 120° C. for 25½ hours. The coating was not attacked by water at room temperature (3 hours) but the addition of 1 gm. of 28% NH₄OH redissolved the coating.

(b) The experiment in (a) was repeated with the addition to the second dish of 0.05 gm. cobalt acetate as a polymerization catalyst. However, the results were the same as in (a) except that all the coating did not dissolve but a water swollen finely dispersed precipitate remained.

(c) A formulation according to this invention was prepared by adding 0.2 gm. of diethylene glycol diacrylate +0.01 gm. Bendax 2Al (sodiu msalt of dodecylated sulfonated phenyl ether) to the third dish. A coating was prepared as in (a) which was water resistant and did not dissolve in NH₄OH after 3 days. While the coating did not dissolve it did swell slowly to a firm gel. The Bendax 2A1 was added to emulsify the diacrylate.

(d) The experiment of (c) was repeated with the last dish but .05 gm. cobalt acetate was also added and a film formed as before. The film was water resistant and swelled slightly to a leathery condition, and it showed no tendency to redissolve in ammonium hydroxide.

EXAMPLE II

Tests were made to determine the lower limits of carboxylic modification of the polyallene by reacting polyallene with maleic anhydride at levels of 60% of theoretical and 70% of theoretical. At the 60% level the modified polyallene was insoluble but swelled in 28% NH₄OH. However, at the 70% level most of the modified polyallene was soluble in 28% NH₄OH.

EXAMPLE III

Experiments were also made using maleimide in place of maleic anhydride as the solubilizing carboxylic dienophile. Polyallene modified with maleimide was soluble in both 28% NH₄OH and dilute NaOH.

EXAMPLE IV

A maleic anhydride modified polyallene similar to that of Example I was prepared as a clear solution by combining 0.5 gm. of said polymer with 3 gm. of water and 1 gm. of 28% NH₄OH. To this was added 0.23 gm. of a compound having the formula:

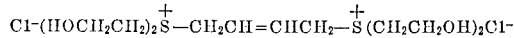

(prepared by reacting 2 moles of thio diglycol with 1,4-dichloro butene-2). The solution was poured on a glass surface, dried and cured at 160° C. for 2 hours. The coating was not attacked by immersion for 4 hours in 28% NH₄OH.

Advantageously an emulsifying agent may be added to the compositions of this invention to emulsify the polyfunctional dienophile utilized as a crosslinking agent. The emulsifying agent may be selected from a large number of materials which do not need to be described in any detail herein since they are well known to the art. Similarly, water soluble accelerators may also be advantageously admixed with the compositions of this invention. Suitable accelerators include cobalt acetate, lead acetate, manganese acetate and the like.

Coatings may be prepared according to this invention which are adherent to glass and other substrates and which are water resistant and alkali insoluble. Other uses suggested by the properties and characteristics of the compositions include adhesives, foams, fibers and the like.

By substantially, it is meant in the disclosure of this invention to include polymers of allene of which at least 50% of the polymer chains have the following formula:

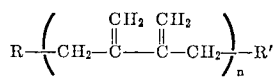

having the definitions previously defined.

What is claimed is:

1. A thermosettable composition which comprises in aqueous admixture:
  (a) a water soluble salt of a volatile nitrogeneous base and a carboxylic modified polyallene wherein said carboxylic polyallene is prepared by reacting an allene polymer substantially of the formula

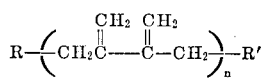

wherein R and R' each may be H,

or OH and $n$ is the average number of repeating groups, with an amount of a carboxylic dienophile sufficient to react with at least about 65% and no more than about 90% of the unsaturation in said allene polymer; and
  (b) an amount of a polyfunctional dienophile sufficient to react with and to crosslink said modified polyallene.

2. The composition of claim 1 wherein said carboxylic dienophile is maleic anhydride.

3. The composition of claim 1 wherein said polyfunctional dienophile is a glycol diacrylate ester.

4. The composition of claim 1 wherein said polyfunctional dienophile is a compound having the formula:

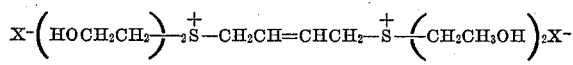

wherein X is a halide.

5. The composition of claim 1 wherein said nitrogenous base is ammonia or ammonium hydroxide.

6. A substrate having a coating comprising the heat cured composition of claim 1.

7. A thermosettable composition which comprises in aqueous admixture:
(a) a water soluble salt of ammonia or ammonium hydroxide and a carboxylic modified polyallene wherein said carboxylic polyallene is prepared by reacting an allene polymer substantially of the formula:

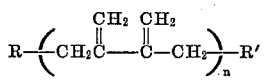

wherein R and R' each may be H,

or OH and $n$ is the average number of repeating groups, with an amount of a carboxylic dienophile sufficient to react with at least about 65% and no more than about 90% of the unsaturation in said allene polymer; and
(b) an amount of a polyfunctional dienophile sufficient to react with and to crosslink said modified polyallene.

8. The composition of claim 7 wherein said carboxylic dienophile is maleic anhydride.

9. The composition of claim 7 wherein said polyfunctional dienophile is a glycol diacrylate ester or a compound having the formula:

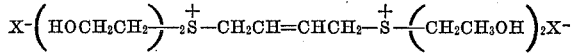

wherein X is a halide.

10. A substrate having a coating comprising the heat cured composition of claim 7.

11. A thermosettable composition which comprises in aqueous admixture
(a) a water soluble salt of ammonia or ammonium hydroxide and a maleic anhydride modified polyallene prepared by reacting an allene polymer substantially of the formula

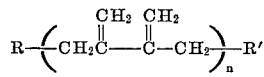

wherein R and R' each may be H,

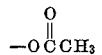

or OH and $n$ is the average number of repeating groups, with an amount of maleic anhydride sufficient to react with at least about 65% and no more than about 90% of the unsaturation in said allene polymer; and
(b) an amount of a glycol diacrylate ester sufficient to react with and to crosslink said modified polyallene.

12. The composition of claim 11 wherein said allene polymer has a molecular weight of about 1000 to about 5000.

13. A substrate having a coating comprising the heat cured composition of claim 11.

References Cited

UNITED STATES PATENTS

| 2,923,692 | 2/1960 | Ackerman et al. | 260—17.4 |
| 3,442,883 | 5/1969 | Shier | 260—94.3 |

JOSEPH L. SCHOFER, Primary Examiner

J. KIGHT, Assistant Examiner

U.S. Cl. X.R.

117—161; 260—78.5